United States Patent
Vignocchi et al.

(10) Patent No.: US 9,387,407 B2
(45) Date of Patent: Jul. 12, 2016

(54) MANAGING OBJECTIVES ASSOCIATED WITH A VIRTUAL SPACE BASED ON CHARACTERS MADE ACCESSIBLE RESPONSIVE TO CORRESPONDING TOKENS BEING DETECTED

(71) Applicant: Disney Enterprises, Inc., Burbank, CA (US)

(72) Inventors: John G. Vignocchi, Studio City, CA (US); Jared Bals, Salt Lake City, UT (US); Troy Leavitt, West Valley City, UT (US); Jeffrey Gosztyla, Salt Lake City, UT (US); Christopher Shen, Holladay, UT (US); Manfred Neber, Salt Lake City, UT (US); Chad Liddell, Taylorsville, UT (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 516 days.

(21) Appl. No.: 13/727,460

(22) Filed: Dec. 26, 2012

(65) Prior Publication Data

US 2014/0176534 A1 Jun. 26, 2014

(51) Int. Cl.
 *G06T 15/00* (2011.01)
 *A63F 13/95* (2014.01)
 *A63F 13/65* (2014.01)
 *A63F 13/21* (2014.01)

(52) U.S. Cl.
 CPC .......... *A63F 13/95* (2014.09); *A63F 13/21* (2014.09); *A63F 13/65* (2014.09)

(58) Field of Classification Search
 None
 See application file for complete search history.

(56) References Cited

U.S. PATENT DOCUMENTS

| 5,190,285 A | 3/1993 | Levy et al. ............... 273/85 G |
| 5,766,077 A | 6/1998 | Hongo ..................... 463/30 |

(Continued)

FOREIGN PATENT DOCUMENTS

| EP | 2749332 | 7/2014 |
| GB | 2 365 364 | 2/2002 |

(Continued)

OTHER PUBLICATIONS

Paul et al., Adaptive Storytelling and Story Repair in a Dynamic Environment, 2011, Springer-Verlag Berlin Heidelberg, pp. 128-139.*

(Continued)

*Primary Examiner* — Anh-Tuan V Nguyen
(74) *Attorney, Agent, or Firm* — Sheppard Mullin Richter & Hampton LLP

(57) ABSTRACT

Objectives, an environment, and/or a theme associated with a virtual space may be managed based on characters made accessible responsive to corresponding tokens being detected. Tokens, including a first token associated with a first character or a second token associated with a second character, may be detected based on signals received from one or more token readers. The first character may be made accessible in the virtual space responsive to the first token being detected and the second character may be made accessible in the virtual space responsive to the second token being detected. Responsive to one or both of the first token being detected or the second token being detected, a given objective associated with the virtual space may be effectuated in the virtual space, an environment of the virtual space may be modified, and/or a theme of the virtual space being modified.

18 Claims, 5 Drawing Sheets

(56) References Cited

U.S. PATENT DOCUMENTS

| | | | |
|---|---|---|---|
| 5,807,174 A | 9/1998 | Fukuhara | |
| 5,853,327 A | 12/1998 | Gilboa | 463/39 |
| 5,855,483 A | 1/1999 | Collins et al. | 434/322 |
| 6,354,947 B1 | 3/2002 | Dobrusskin et al. | 463/43 |
| 6,361,396 B1 | 3/2002 | Snyder et al. | 446/397 |
| 6,364,735 B1 | 4/2002 | Bristow et al. | 446/397 |
| 6,650,870 B2 | 11/2003 | White et al. | 455/41 |
| 6,735,324 B1 | 5/2004 | McKinley et al. | 382/100 |
| 6,761,637 B2 | 7/2004 | Weston et al. | 463/42 |
| 6,773,325 B1 | 8/2004 | Mawle et al. | 446/175 |
| 6,835,131 B1 | 12/2004 | White et al. | 463/1 |
| 6,877,096 B1 | 4/2005 | Chung et al. | 713/185 |
| 6,967,566 B2 | 11/2005 | Weston et al. | 340/323 R |
| 7,001,276 B2 | 2/2006 | Shinoda | 463/25 |
| 7,066,781 B2 | 6/2006 | Weston | 446/268 |
| 7,081,033 B1 | 7/2006 | Mawle et al. | 446/175 |
| 7,244,183 B1 | 7/2007 | England | 463/48 |
| 7,297,063 B2 | 11/2007 | Fujisawa et al. | 463/43 |
| D559,327 S | 1/2008 | Luk et al. | D21/332 |
| 7,338,377 B2 | 3/2008 | Shinoda | 463/47 |
| 7,426,642 B2 | 9/2008 | Aupperle et al. | 713/185 |
| 7,488,231 B2 | 2/2009 | Weston | 446/175 |
| 7,502,759 B2 | 3/2009 | Hannigan et al. | 705/51 |
| 7,534,157 B2 | 5/2009 | Ganz | 446/175 |
| 7,559,834 B1 * | 7/2009 | York | 463/2 |
| 7,636,783 B2 | 12/2009 | Heutchy et al. | 709/227 |
| 7,677,948 B2 | 3/2010 | Ganz | 446/175 |
| D620,256 S | 7/2010 | Fujimura et al. | D3/294 |
| D620,257 S | 7/2010 | Fujimura et al. | D3/294 |
| 7,789,726 B2 | 9/2010 | Ganz | 446/175 |
| D626,978 S | 11/2010 | Huh | D15/126 |
| 7,843,334 B2 | 11/2010 | Kumagai et al. | 340/539.13 |
| 7,843,471 B2 | 11/2010 | Doan et al. | 345/633 |
| 7,846,004 B2 | 12/2010 | Ganz | 446/175 |
| 7,883,416 B2 | 2/2011 | Dobrusskin et al. | 463/37 |
| 7,883,420 B2 | 2/2011 | Bradbury et al. | 463/43 |
| 7,886,156 B2 | 2/2011 | Franchi | 713/186 |
| 7,905,779 B2 | 3/2011 | Dyke et al. | 463/30 |
| 7,933,968 B1 | 4/2011 | Zimmerman | 709/217 |
| 8,002,605 B2 | 8/2011 | Ganz | 446/175 |
| D645,910 S | 9/2011 | Foster et al. | D21/333 |
| 8,025,573 B2 | 9/2011 | Stenton et al. | 463/43 |
| 8,033,901 B2 | 10/2011 | Wood | 463/1 |
| D657,426 S | 4/2012 | Gomez | |
| D666,249 S | 8/2012 | Minchella Jennings et al. | D21/333 |
| 8,323,068 B2 | 12/2012 | Ganetakos et al. | 446/175 |
| 8,401,913 B2 | 3/2013 | Alivandi | 705/26.1 |
| D680,594 S | 4/2013 | Mercier et al. | D21/330 |
| D687,106 S | 7/2013 | Menting | D21/398 |
| 8,521,180 B2 | 8/2013 | Parish | |
| 8,726,172 B1 | 5/2014 | Vignocchi et al. | 715/757 |
| D710,945 S | 8/2014 | Biheller et al. | D21/333 |
| 8,854,178 B1 | 10/2014 | Mangold | |
| 8,864,589 B2 | 10/2014 | Reiche, III | 463/44 |
| 8,904,298 B2 | 12/2014 | Nelson et al. | 715/757 |
| 8,909,920 B2 | 12/2014 | Vignocchi et al. | 713/159 |
| 8,910,266 B2 | 12/2014 | Vignocchi et al. | 726/9 |
| 8,961,315 B1 * | 2/2015 | Adogla | 463/42 |
| 8,972,369 B2 | 3/2015 | Vignocchi | |
| 8,986,115 B2 | 3/2015 | Vignocchi | |
| 9,092,114 B2 | 7/2015 | Nelson | |
| 2002/0090985 A1 | 7/2002 | Tochner | |
| 2003/0037075 A1 | 2/2003 | Hannigan et al. | 707/500 |
| 2004/0002369 A1 * | 1/2004 | Walker et al. | 463/1 |
| 2004/0029625 A1 | 2/2004 | Annunziata | 463/1 |
| 2004/0092311 A1 | 5/2004 | Weston et al. | 463/42 |
| 2004/0204212 A1 * | 10/2004 | Sato | 463/5 |
| 2004/0266505 A1 | 12/2004 | Keam et al. | 463/1 |
| 2005/0245302 A1 | 11/2005 | Bathiche et al. | 463/1 |
| 2006/0009287 A1 | 1/2006 | Engelfriet | 463/35 |
| 2006/0047825 A1 | 3/2006 | Steenstra | |
| 2006/0063575 A1 | 3/2006 | Gatto | |
| 2006/0094501 A1 | 5/2006 | O'Leary et al. | 463/30 |
| 2006/0148545 A1 * | 7/2006 | Rhyne et al. | 463/42 |
| 2006/0154711 A1 | 7/2006 | Ellis | |
| 2006/0234601 A1 | 10/2006 | Weston | |
| 2007/0015588 A1 | 1/2007 | Matsumoto et al. | 463/43 |
| 2007/0087798 A1 | 4/2007 | McGucken | |
| 2007/0087831 A1 | 4/2007 | Van Luchene | |
| 2007/0087839 A1 | 4/2007 | Bradbury et al. | 463/43 |
| 2007/0197297 A1 | 8/2007 | Witchey | 463/42 |
| 2007/0207860 A1 * | 9/2007 | Yamauchi et al. | 463/42 |
| 2007/0211047 A1 | 9/2007 | Doan et al. | 345/419 |
| 2007/0218965 A1 * | 9/2007 | Tilston et al. | 463/2 |
| 2008/0085773 A1 | 4/2008 | Wood | 463/43 |
| 2008/0104018 A1 | 5/2008 | Xia | |
| 2008/0161113 A1 | 7/2008 | Hansen et al. | 463/42 |
| 2008/0280684 A1 | 11/2008 | McBride et al. | 463/42 |
| 2008/0300053 A1 | 12/2008 | Muller | 463/31 |
| 2009/0002377 A1 | 1/2009 | Lee et al. | 345/473 |
| 2009/0005167 A1 * | 1/2009 | Arrasvuori et al. | 463/40 |
| 2009/0023487 A1 | 1/2009 | Gilson et al. | 463/11 |
| 2009/0053970 A1 | 2/2009 | Borge | 446/268 |
| 2009/0137323 A1 | 5/2009 | Fiegener et al. | 463/43 |
| 2009/0149232 A1 * | 6/2009 | Gosztyla et al. | 463/7 |
| 2009/0170585 A1 * | 7/2009 | Yang | 463/16 |
| 2009/0197658 A1 | 8/2009 | Polchin | 463/9 |
| 2009/0203446 A1 | 8/2009 | Bradbury et al. | 463/40 |
| 2009/0291764 A1 | 11/2009 | Kirkman et al. | 463/43 |
| 2009/0307611 A1 | 12/2009 | Riley | 715/757 |
| 2010/0023492 A1 | 1/2010 | Lucas | 707/3 |
| 2010/0075761 A1 * | 3/2010 | Lord et al. | 463/43 |
| 2010/0114614 A1 | 5/2010 | Sharpe | |
| 2010/0144429 A1 | 6/2010 | Ryan | |
| 2010/0151940 A1 | 6/2010 | Borge | 463/29 |
| 2010/0292008 A1 * | 11/2010 | Matsumura | 463/36 |
| 2011/0045913 A1 | 2/2011 | Walker et al. | 463/42 |
| 2011/0107239 A1 | 5/2011 | Adoni et al. | 715/757 |
| 2011/0159963 A1 | 6/2011 | Link | |
| 2011/0165939 A1 | 7/2011 | Borst | |
| 2011/0231781 A1 | 9/2011 | Betzler et al. | 715/757 |
| 2011/0250954 A1 | 10/2011 | Braund | 463/29 |
| 2011/0263322 A1 | 10/2011 | Van Luchene | 463/29 |
| 2011/0263332 A1 | 10/2011 | Mizrachi | 463/42 |
| 2011/0264741 A1 | 10/2011 | Ganetakos | |
| 2011/0270751 A1 | 11/2011 | Csinger | |
| 2011/0288914 A1 | 11/2011 | Guthrie | 705/14.4 |
| 2011/0294574 A1 | 12/2011 | Yamada et al. | 463/30 |
| 2012/0015748 A1 | 1/2012 | Osada | 463/43 |
| 2012/0064968 A1 | 3/2012 | Youm et al. | 463/29 |
| 2012/0077599 A1 | 3/2012 | VanLuchene | |
| 2012/0142429 A1 | 6/2012 | Muller | 463/42 |
| 2012/0172131 A1 | 7/2012 | Boswell et al. | 463/42 |
| 2012/0238362 A1 | 9/2012 | Janis et al. | 463/31 |
| 2012/0252570 A1 | 10/2012 | Kwant | |
| 2012/0295702 A1 | 11/2012 | Otero et al. | 463/31 |
| 2012/0295703 A1 | 11/2012 | Reiche et al. | 763/31 |
| 2012/0295704 A1 | 11/2012 | Reiche et al. | 463/31 |
| 2012/0302356 A1 | 11/2012 | Annunziata | 463/42 |
| 2012/0311688 A1 | 12/2012 | Lemus et al. | 726/8 |
| 2012/0315983 A1 | 12/2012 | Miller, IV et al. | 463/29 |
| 2012/0331529 A1 | 12/2012 | Ibel et al. | 726/4 |
| 2013/0017891 A1 | 1/2013 | Romero | |
| 2013/0040654 A1 | 2/2013 | Parish | |
| 2013/0079132 A1 | 3/2013 | Archer et al. | 463/31 |
| 2013/0290137 A1 | 10/2013 | Olomskiy | 405/26.41 |
| 2013/0290147 A1 | 10/2013 | Chandra et al. | 705/27.1 |
| 2013/0296043 A1 | 11/2013 | Weinshanker et al. | 463/30 |
| 2014/0066209 A1 | 3/2014 | Annambhotla | 463/42 |
| 2014/0176534 A1 | 6/2014 | Vignocchi | |
| 2014/0179418 A1 | 6/2014 | Vignocchi et al. | 463/29 |
| 2014/0179443 A1 | 6/2014 | Vignocchi et al. | 463/43 |
| 2014/0179444 A1 | 6/2014 | Vignocchi et al. | 463/43 |
| 2014/0181062 A1 | 6/2014 | Vignocchi et al. | 707/705 |
| 2014/0181507 A1 | 6/2014 | Vignocchi et al. | 713/159 |
| 2014/0181706 A1 | 6/2014 | Vignocchi | 715/764 |
| 2014/0181820 A1 | 6/2014 | Vignocchi et al. | 718/100 |
| 2014/0181994 A1 | 6/2014 | Vignocchi et al. | 726/28 |
| 2014/0223534 A1 | 8/2014 | Vignocchi et al. | 726/9 |
| 2014/0304624 A1 | 10/2014 | Nelson, et al. | 715/757 |
| 2015/0033154 A1 | 1/2015 | Nelson | |

(56) References Cited

U.S. PATENT DOCUMENTS

| | | | |
|---|---|---|---|
| 2015/0033317 | A1 | 1/2015 | Vignocchi |
| 2015/0134658 | A1 | 5/2015 | Vignocchi |
| 2015/0294508 | A1 | 10/2015 | Nelson |

FOREIGN PATENT DOCUMENTS

| | | |
|---|---|---|
| WO | WO 01/69572 | 9/2001 |
| WO | WO 01/69830 | 9/2001 |
| WO | WO 03/043709 | 5/2003 |
| WO | WO 2007/101785 | 9/2007 |

OTHER PUBLICATIONS

U.S. Appl. No. 60/151,586, filed Aug. 30, 1999 in the name of Tony Forrest Rodriguez, 4 pages.

U.S. Appl. No. 60/288,272, filed May 2, 2001 in the name of Ravi K. Sharma et al., 31 pages.

U.S. Appl. No. 60/297,229, filed Jun. 7, 2001 in the name of Brett T. Hannigan et al., 46 pages.

U.S. Appl. No. 60/335,908, filed Nov. 14, 2001 in the name of Stephen C. Beck, 120 pages.

U.S. Appl. No. 60/355,856, filed Feb. 10, 2002 in the name of Brett T. Hannigan et al., 53 pages.

Varney, Allen et al., "Paranoia XP", Mongoose Publishing, Dec. 31, 2004, ISBN: 978-1-904854-26-5, retrieved from the Internet: URL:http://fc09.deviantart.net/fs71/f/2012/316/e/6/paranoia_player_section_by_atta_crossroads-d4zxv52.pdf, retrieved Apr. 16, 2014, 110 pages.

Diablo III, Wikipedia.org, online, accessed via the Internet, accessed Jun. 26, 2014, URL: <http://en.wikipedia.org/wiki/Diablo_III>, 25 pages.

Stash, Diablowiki.net, online, accessed via the Internet, accessed Jun. 26, 2014, URL: <http://www.diablowiki.net/Stash>, 7 pages.

Gear Sets, Diablowiki.net, online, accessed via the Internet, accessed Jun. 26, 2014, URL: <http://www.diablowiki.net/Gear_sets>, 8 pages.

Weapons, Diablowiki.net, online, accessed via the Internet, accessed Jun. 26, 2014, URL: <http://www.diablowiki.net/Weapons>, 7 pages.

Fundamentals, Battle.net, online, accessed via the Internet, accessed Jun. 26, 2014, URL: <http://us.battle.net/d3/en/game/guide/gameplay/fundamentals>, 13 pages.

Inventory, Battlet.net, online, accessed via the Internet, accessed Jun. 26, 2014, URL: <http://us.battle.net/d3/en/game/guide/items/inventory>, 9 pages.

Toy Story 3: The Video Game, Wikipedia.org, online, accessed via the Internet, accessed Jun. 26, 2014, URL: <http:/en.wikipedia.org/wiki/Toy_Story_3:_The_Video_Game>, 10 pages.

Toy Story 3 Toy Box Mode Demo, Youtube.com, online, May 8, 2010, accessed via the Internet, accessed Jun. 26, 2014, URL: <http://www.youtube.com/watch?v=Do84qnpfUvQ>, 2 pages.

Crecente, Brian, "Diving Into Toy Story 3's Toy Box", Kotaku.com, online, May 20, 2010, accessed via the Internet, accessed Jun. 26, 2014, URL: <http://kotaku.com/5543513/diving-into-toy-story-3s-toy-box>, 4 pages.

Whitehead, Dan, "Toy Story 3 p. 2", Eurogamer.net, online, Jul. 14, 2010, accessed via the Internet, accessed Jun. 26, 2014, URL: <http://www.eurogamer.net/articles/toy-story-3-review?page=2>, 2 pages.

[Guide] Item Drops That Starts Quest [LvL 1-85 Zones]. Eu.battle.net. Online. Dec. 31, 2010. Accessed via the Internet. Accessed Nov. 13, 2014. <URL:http://eu.battle.net/wow/en/forum/topic/1415204550>, 18 pages.

Blood Elf Plans. Eu.battle.net. Online. Accessed via the Internet. Accessed Nov. 13, 2014. <URL:http://eu.battle.net/wow/en/item/24414>, 2 pages.

Barnett, Emma; "New App Automates Foursquare 'Check-Ins'", The Telegraph, Aug. 3, 2010, as published at http://www.telegraph.co.uk/technology/news/7924803/New-app-automates-four-square-check-ins.html. (4 pages).

Lapenna, Joe; "Check in With Google Latitude," Google Mobile Blog, Feb. 1, 2011, as published at http://www.googlemobile.blogspot.com/2011/02/check-in-with-google-latitude.html. (12 pages).

Paul et al., "Adaptive Storytelling and Story Repair in a Dynamic Environment" 2011, Springer-Verlag Berlin Heidelberg, pp. 128-139.

"The Legend of Zelda: Phantom Hourglass—Instruction Booklet", Jan. 1, 2007, XP002582478, retrieved from the Internet: URL:http://www.nintendo.com/consumer/gameslist/manuals/DS_Zelda_Phantom_Hourglass.pdf [retrieved on Jun. 1, 2010], pp. 1-18.

Anonymous, "Auction House/Barter House", Path of Exile—Forum, Retrieved from the Internet: URL: https://www.pathofexile.com/forum/view-thread/29205 [retrieved on Oct. 13, 2015], Apr. 25, 2012, XP055220590, 9 pages.

Anonymous, "Trade", WoWWiki—Your Guide to the World of Warcraft and Its Universe, Retrieved from the Interent: URL: http://wowwiki.wikia.com/wiki/Trade [retrieved on Oct. 13, 2015], Dec. 18, 2012, XP055220546, 3 pages.

European Examination Report issued in European Patent Application No. 13199483.2, dated Nov. 10, 2015, 7 pages.

\* cited by examiner

MANAGING OBJECTIVES ASSOCIATED WITH A VIRTUAL SPACE BASED ON CHARACTERS MADE ACCESSIBLE RESPONSIVE TO CORRESPONDING TOKENS BEING DETECTED

FIELD OF THE DISCLOSURE

This disclosure relates to managing objectives, an environment, and/or a theme associated with a virtual space based on characters made accessible responsive to corresponding tokens being detected.

BACKGROUND

Conventionally, various aspects of a virtual space may be managed. Such managing, however, may be typically based on a stage or level of completion of gameplay within the virtual space. For example, in a videogame, an environment may be modified, or a new environment may be introduced, responsive to a user reaching a certain level of gameplay. Furthermore, the availability of specific user characters and/or non-user characters may generally also be dependent on a stage or level of completion of gameplay within the virtual space.

SUMMARY

One aspect of the disclosure relates to a system configured to manage objectives, an environment, and/or a theme associated with a virtual space based on characters made accessible responsive to corresponding tokens being detected, in accordance with one or more implementations. A token may be associated with a character. The token may be configured to depict the character. The token may be detected based on signals received from one or more token readers. The character may be made accessible in the virtual space responsive to the token being detected. Responsive to the first token being detected a given objective associated with the virtual space may be effectuated in the virtual space, an environment of the virtual space may be modified, and/or a theme of the virtual space being modified.

The system may include one or more virtual space platforms. The virtual space platform(s) may be configured to execute one or more computer program modules. The computer program modules may include one or more of a user module, a space module, a token detection module, an objectives management module, an environment management module, a theme management module, a history module, a user selection interface module, and/or other modules. The user module may be configured to access and/or manage one or more user profiles and/or user information associated with users of system. The space module may be configured to implement the instance of the virtual space executed by the computer modules to determine views of the virtual space.

The token detection module may be configured to detect tokens based on signals received from one or more token readers. A given token may be a standalone physical object. The given token may be associated with a given character. In some implementations, the given token may be configured to depict the given character. The given character may be accessible in the virtual space responsive to the given token being detected. Examples of the given token may include one or more of a toy figuring, a coin, and/or other form factors suitable to be tokens as described herein.

The objectives management module may be configured to manage objectives associated with the virtual space. Generally speaking, a given objective may be a purpose or goal that efforts or actions within the virtual space are intended to attain or accomplish. By way of non-limiting example, an objective may include a set of actions that must be performed by a user character in order to advance to a next level of gameplay in the virtual space. In some implementations, a given objective may be effectuated in the virtual space responsive to a given token being detected.

Where the tokens include a first token associated with a first character and a second token associated with a second character, and where the objectives include a first objective and a second objective, the first objective may be effectuated in the virtual space responsive to the first token being detected and the second objective may be effectuated in the virtual space responsive to the second token being detected. In some implementations, the first character may be assigned the first objective responsive to the first objective being effectuated in the virtual space. In some implementations, the first character may be assigned the second objective responsive to the second objective being effectuated in the virtual space. The first objective may be modified responsive to the second objective being effectuated in the virtual space. According to some implementations, a third objective may be effectuated in the virtual space responsive to both the first token and the second token being detected. The third objective may include one or more attributes of the first objective and one or more attributes of the second objective.

The environment management module may be configured to manage an environment of the virtual space. Generally speaking, the environment may be an aggregate of surroundings and conditions of the virtual space. By way on non-limiting example, the surroundings of the virtual space may include one or more of the appearance of the virtual space, a color scheme of the virtual space, a sound and/or soundtrack associated with the virtual space, and/or other aspects of the surroundings of the virtual space. The conditions of the virtual space may include one or more of laws of nature (e.g., gravity) of the virtual space, weather depicted in the virtual space, and/or other aspects of the conditions of the virtual space. The environment management module may be configured to modify the environment of the virtual space responsive to a given token being detected. Modifying the environment may include modifying one or both of the surroundings or the conditions of the virtual space.

According to some implementations, where the tokens include a first token associated with a first character and a second token associated with a second character, the environment may be modified responsive to one or both of the first token being detected or the second token being detected. A modification to one or both of the surroundings or the conditions of the virtual space may be based on one or both of (1) a theme associated with the first character or (2) a theme associated with the second character. Themes are described further herein in connection with the theme management module. In some implementations, modifying the environment may include one or both of (1) effectuating one or more first environmental features in the environment of the virtual space responsive to the first token being detected or (2) effectuating one or more second environmental features in the environment of the virtual space responsive to the first token being detected. Given environmental features may include portions or aspects of the environment of the virtual space that are associated with a given character.

In some implementations, the environment of the virtual space may be perceived in a first manner by the first character and in a second manner by the second character. The first manner may be different from the second manner. By way of non-limiting example, the first character may perceive the virtual space at nighttime, while the second character may perceive the virtual space in the daytime. The first manner of perceiving the environment of the virtual space may correspond to a theme associated with the first character. The second manner of perceiving the environment of the virtual space may correspond to a theme associated with the second character. Again, themes are described further herein in connection with the theme management module.

The theme management module may be configured to manage a theme of the virtual space. Generally speaking, the theme of the virtual space may be a unifying subject associated with the virtual space. A given character may be one of a given plurality of characters associated with a given theme. The theme of the virtual space may be modified based on the given theme responsive to a token associated with the given character being detected. Modifying the theme of the virtual space based on the given theme may include incorporating one or more attributes of the given theme in the theme of the virtual space. Examples of such attributes may include one or more of designs, symbols, color schemes, music, and/or other attributes that identify a given theme.

According to some implementations, where the tokens include a first token associated with a first character and a second token associated with a second character, the first character may be one of a first plurality of characters associated with a first theme and the second character may be one of a second plurality of characters associated with a second theme. The first theme may be different from the second theme. The theme of the virtual space may include a combination of the first theme and the second theme. In some implementations, the theme of the virtual space may be perceived in a first manner by the first character and in a second manner by the second character. The first manner of perceiving the theme of the virtual space may correspond to the first theme, while the second manner of perceiving the theme of the virtual space may correspond to the second theme.

The history module may be configured to record information associated with the virtual space. Such information may include one or more of things effectuated within the virtual space, modifications made to the virtual space, and/or other information associated with the virtual space. Recording such information may ensure or promote unique user experiences.

In some implementations, the history module may be configured to record objectives effectuated in the virtual space. The objectives management module may be configured such that, based on the recorded objectives (1) a given combination of objectives may not be effectuated more than once in the virtual space, (2) a given objective may not be effectuated more than once in the virtual space, or (3) a given objective may not be assigned to the same character more than once.

In some implementations, history module may be configured to record modifications made to the environment of the virtual space. The environment management module may be configured such that, based on the recorded modifications, a given modification to the environment of the virtual space may not be made more than once.

The history module may be configured to record modifications made to the theme of the virtual space. The theme management module may be configured such that, based on the recorded modifications, a given modification to the theme of the virtual space may not be made more than once.

The user selection interface module may be configured to provide a user selection interface. The user selection interface may include one or more of an objective field, an environment field, a theme field, and/or other fields and/or information.

The objective field may be configured to receive user selections associated with the objectives effectuated in the virtual space. The environment field may be configured to receive user selections associated with modifications to the environment of the virtual space. The theme field may be configured to receive user selections associated with the theme of the virtual space.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
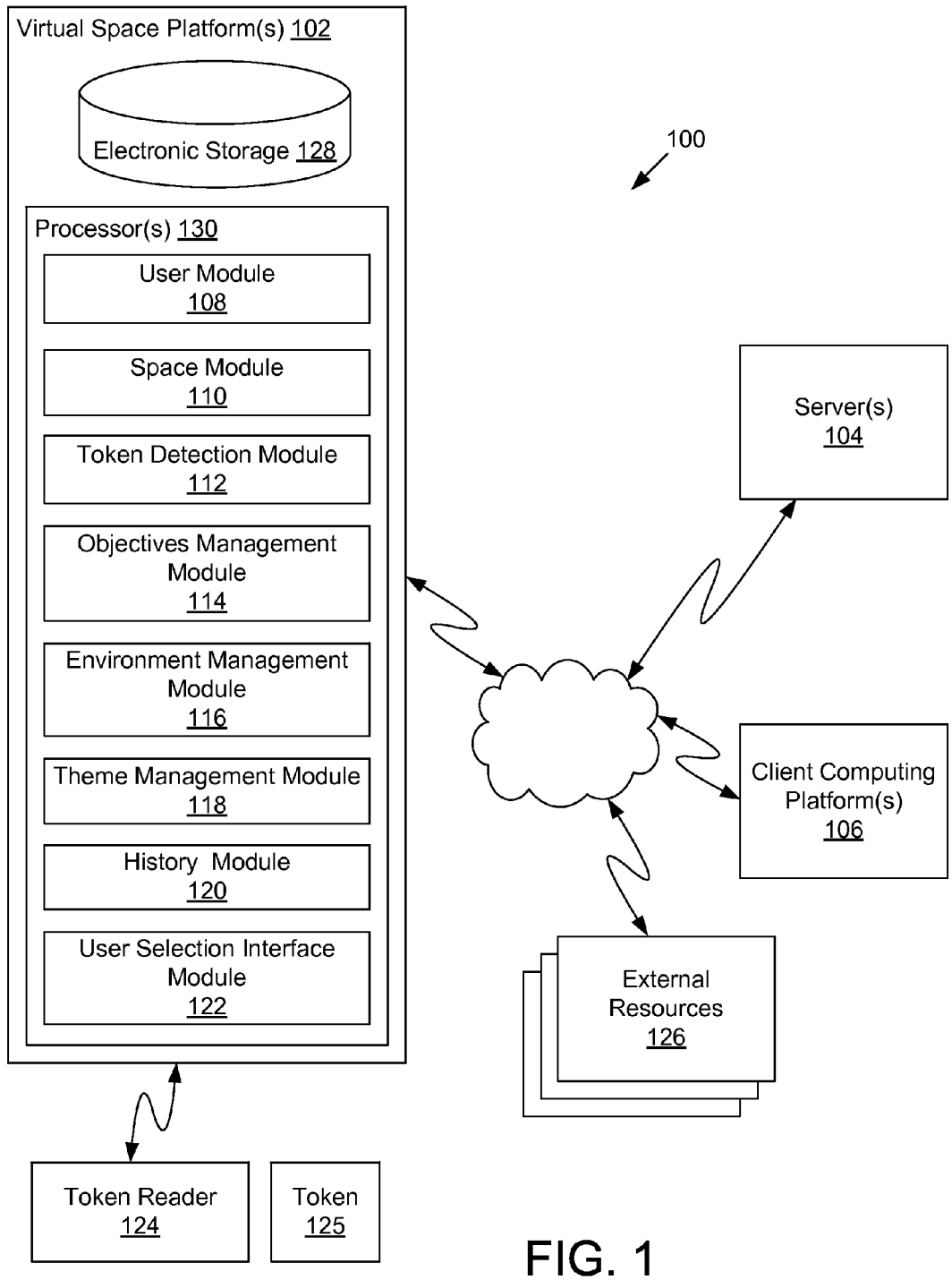
FIG. 1 illustrates a system configured to manage objectives, an environment, and/or a theme associated with a virtual space based on characters made accessible responsive to corresponding tokens being detected, in accordance with one or more implementations.

FIG. 1 illustrates a system 100 configured to manage objectives, an environment, and/or a theme associated with a virtual space based on characters made accessible responsive to corresponding tokens being detected, in accordance with one or more implementations. In exemplary implementations, a given token may be configured to depict a given character. By way of non-limiting example, the given character may be Captain Jack Sparrow, the fictional character and protagonist of the Pirates of the Caribbean film series. The given token may be a toy figurine embodying the appearance of Captain Jack Sparrow. The toy figurine may be configured to be detected by one or more token readers. In some implementations, the toy figurine may be disposed upon the token reader in order for it to be detected. The Captain Jack Sparrow character may be made accessible in the virtual space responsive to the toy figurine being detected.

According to some implementations, responsive to the toy figurine being detected, a given objective associated with the virtual space may be effectuated in the virtual space, an environment of the virtual space may be modified, and/or a theme of the virtual space being modified. The given objective may be associated with the Captain Jack Sparrow character. For example, the given objective may include attaining a goal of Captain Jack Sparrow from the storyline of the Pirates of the Caribbean film series. A given modification to the environment may alter the environment of the virtual space so that it resembles an environment depicted the Pirates of the Caribbean film series. A given modification to the theme may alter the theme of the virtual environment so that it includes elements of the Pirates of the Caribbean theme.

The system 100 may include one or more virtual space platforms 102. In some implementations, virtual space platform(s) 102 may be one or more servers (e.g., server(s) 104) configured to communicate with one or more client computing platform (e.g., client computing platforms 106) according to a client/server architecture. According to some implementations, virtual space platform(s) 102 may be one or more client computing platforms (e.g., client computing platforms 106). In some implementations, virtual space platform(s) 102 may communicate with other virtual space platform(s) 102 according to a peer-to-peer architecture. The users may access system 100 and/or the virtual space via the virtual space platform(s) 102 and/or client computing platform(s) 106.

The virtual space platform(s) 102 may be configured to execute one or more computer program modules. The computer program modules may include one or more of a user module 108, a space module 110, a token detection module 112, an objectives management module 114, an environment management module 116, a theme management module 118, a history module 120, a user selection interface module 122, and/or other modules.

The user module 108 may be configured to access and/or manage one or more user profiles and/or user information associated with users of system 100. The one or more user profiles and/or user information may include information stored by virtual space platform(s) 102 and/or other storage locations. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users.

The space module 110 may be configured to implement the instance of the virtual space executed by the computer modules to determine views of the virtual space. In some implementations, the views may then be communicated (e.g., via streaming, via object/position data, and/or other information) from server(s) 104 to client computing platform(s) 106 for presentation to users. The view determined and presented to a given user may correspond to a user character being controlled by the given user. The view determined and presented to the given user may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via virtual space platform(s) 102 and/or clients (e.g., client computing platform(s) 106) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of the virtual space are determined by space module 110 is not intended to be limiting. The space module 110 may be configured to express the virtual space in a more limited, or richer, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space module 110, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through virtual space platform(s) 102 and/or clients (e.g., client computing platform(s) 106). The users may interact with each other through communications exchanged within the virtual space. Such communications may include one or more of textual chat, instant messages, private messages, voice communications, and/or other communications. Communications may be received and entered by the users via their respective virtual space platform(s) 102 and/or client(s) (e.g., client computing platform(s) 106). Communications may be routed to and from the appropriate users through virtual space platform(s) 102 (e.g., through space module 110).

The token detection module 112 may be configured to detect tokens based on signals received from a token reader 124. A given token (e.g., token 125) may be a standalone physical object. The given token may be associated with a given character. In some implementations, the given token may be configured to depict the given character. The given character may be accessible in the virtual space responsive to the given token being detected. Examples of the given token may include one or more of a toy figuring, a coin, and/or other form factors suitable to be tokens as described herein.

Individual tokens may be configured to be detectable by token reader 124. In some implementations, detection of a given token may be based on a shape of a portion of the given token. In some implementations, a given token may be detectable based on a given signal conveying information associated with the given token. Detection of a given token may be facilitated by electronics embedded within or otherwise included in the given token. For example, the given token may include a radio-frequency identification (RFID) chip configured to emit radio-frequency electromagnetic fields responsive to the given token being disposed in a proximity of token reader 124. As another example, the given token may include an integrated circuit configured to transfer information associated with the given token responsive to the given token being placed in contact with a portion of token reader 124.

According to some implementations, virtual space content associated with (1) objectives associated with the virtual space, (2) an environment of the virtual space, (3) a theme of the virtual space, and/or other virtual space content may be stored at a location other than one or more of the tokens. That is, a given token may not store virtual space content. A given token may store information used to detect the given token. A given token may not store information other than what may be used to detect the given token. Virtual space content may be information used by space module 110 to affect views and/or gameplay of the virtual space. Such virtual space content may be stored by the virtual space platform(s) and/or by one or more other components of system 100.

The token reader 124 may be configured to provide signals associated with individual tokens. For example, a given signal associated with a given token may convey information associated with the given token. In some implementations, token reader 124 may be configured to provide a first signal responsive to one or more of (1) a first token abutting a portion of the token reader, (2) the first token being disposed in a proximity of the token reader, and/or other actions configured to facilitate detection of the first token. According to some implementations, token reader 124 may be a peripheral device configured to be communicatively coupled with one or more components of system 100. In some implementations, token reader 124 may be integrated so as to form a singular device with a component of system 100 (e.g., a given virtual space platform 102).

The objectives management module 114 may be configured to manage objectives associated with the virtual space. Generally speaking, a given objective may be a purpose or goal that efforts or actions within the virtual space are intended to attain or accomplish. By way of non-limiting example, an objective may include a set of actions that must be performed by a user character in order to advance to a next level of gameplay in the virtual space. In some implementations, a given objective may be effectuated in the virtual space responsive to a given token being detected.

Where the tokens include a first token associated with a first character and a second token associated with a second character, and where the objectives include a first objective and a second objective, the first objective may be effectuated in the virtual space responsive to the first token being detected and the second objective may be effectuated in the virtual space responsive to the second token being detected. By way of non-limiting example, the first character may be Captain Jack Sparrow and the second character may be Buzz Lightyear, the fictional character and deuteragonist of the Toy Story film series. The first objective may relate to swashbuckling and the second object may relate to a space adventure. In some implementations, the first character may be assigned the first objective responsive to the first objective being effectuated in the virtual space. In some implementations, the first character may be assigned the second objective responsive to the second objective being effectuated in the virtual space. The first objective may be modified responsive to the second objective being effectuated in the virtual space. According to some implementations, a third objective may be effectuated in the virtual space responsive to both the first token and the second token being detected. The third objective may include one or more attributes of the first objective and one or more attributes of the second objective.

The environment management module 116 may be configured to manage an environment of the virtual space. Generally speaking, the environment may be an aggregate of surroundings and conditions of the virtual space. By way on non-limiting example, the surroundings of the virtual space may include one or more of the appearance of the virtual space, a color scheme of the virtual space, a sound and/or soundtrack associated with the virtual space, and/or other aspects of the surroundings of the virtual space. The conditions of the virtual space may include one or more of laws of nature (e.g., gravity) of the virtual space, weather depicted in the virtual space, and/or other aspects of the conditions of the virtual space. The environment management module 116 may be configured to modify the environment of the virtual space responsive to a given token being detected. Modifying the environment may include modifying one or both of the surroundings or the conditions of the virtual space.

According to some implementations, where the tokens include a first token associated with a first character and a second token associated with a second character, the environment may be modified responsive to one or both of the first token being detected or the second token being detected. A modification to one or both of the surroundings or the conditions of the virtual space may be based on one or both of (1) a theme associated with the first character or (2) a theme associated with the second character. Themes are described further herein in connection with theme management module 118. In some implementations, modifying the environment may include one or both of (1) effectuating one or more first environmental features in the environment of the virtual space responsive to the first token being detected or (2) effectuating one or more second environmental features in the environment of the virtual space responsive to the first token being detected. Given environmental features may include portions or aspects of the environment of the virtual space that are associated with a given character.

In some implementations, the environment of the virtual space may be perceived in a first manner by the first character and in a second manner by the second character. The first manner may be different from the second manner. By way of non-limiting example, the first character may perceive the virtual space at nighttime, while the second character may perceive the virtual space in the daytime. The first manner of perceiving the environment of the virtual space may correspond to a theme associated with the first character. The second manner of perceiving the environment of the virtual space may correspond to a theme associated with the second character. Again, themes are described further herein in connection with theme management module 118.

The theme management module 118 may be configured to manage a theme of the virtual space. Generally speaking, the theme of the virtual space may be a unifying subject associated with the virtual space. A given character may be one of a given plurality of characters associated with a given theme. The theme of the virtual space may be modified based on the given theme responsive to a token associated with the given character being detected. Modifying the theme of the virtual space based on the given theme may include incorporating one or more attributes of the given theme in the theme of the virtual space. Examples of such attributes may include one or more of objects, designs, symbols, color schemes, music, and/or other attributes that identify a given theme.

According to some implementations, where the tokens include a first token associated with a first character and a second token associated with a second character, the first character may be one of a first plurality of characters associated with a first theme and the second character may be one of a second plurality of characters associated with a second theme. The first theme may be different from the second theme. By way of non-limiting example, where the first character is Captain Jack Sparrow and the second character is Buzz Lightyear, the first theme may relate to Pirates of the Caribbean and the second theme may relate to Toy Story. The theme of the virtual space may include a combination of the first theme and the second theme. In some implementations, the theme of the virtual space may be perceived in a first manner by the first character and in a second manner by the second character. The first manner of perceiving the theme of the virtual space may correspond to the first theme, while the second manner of perceiving the theme of the virtual space may correspond to the second theme.

The history module 120 may be configured to record information associated with the virtual space. Such information may include one or more of things effectuated within the virtual space, modifications made to the virtual space, and/or other information associated with the virtual space. Recording such information may ensure or promote unique user experiences.

In some implementations, history module 120 may be configured to record objectives effectuated in the virtual space. The objectives management module 114 may be configured such that, based on the recorded objectives (1) a given combination of objectives may not be effectuated more than once in the virtual space, (2) a given objective may not be effectuated more than once in the virtual space, or (3) a given objective may not be assigned to the same character more than once.

In some implementations, history module 120 may be configured to record modifications made to the environment of the virtual space. The environment management module 116 may be configured such that, based on the recorded modifications, a given modification to the environment of the virtual space may not be made more than once.

The history module 120 may be configured to record modifications made to the theme of the virtual space. The theme management module 118 may be configured such that, based on the recorded modifications, a given modification to the theme of the virtual space may not be made more than once.

Figure 2:
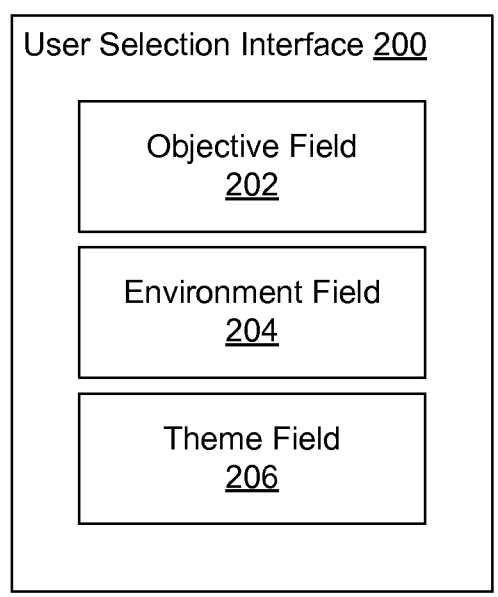
FIG. 2 illustrates a user selection interface, in accordance with one or more implementations.

The user selection interface module 122 may be configured to provide a user selection interface. FIG. 2 illustrates a user selection interface 200, in accordance with one or more implementations. The user selection interface 200 may be presented via a virtual space platform(s) 102 and/or client computing platform(s) 106. As depicted in FIG. 2, user selection interface 200 may include one or more of an objective field 202, an environment field 204, a theme field 206, and/or other fields and/or information. The depiction of user selection interface 200 in FIG. 2 is not intended to be limiting as one or more of fields 202, 204, and/or 206 may be omitted or combined with another field.

The objective field 202 may be configured to receive user selections associated with the objectives effectuated in the virtual space. In some implementations, user selection interface 202 (e.g., via objective field 202) may be configured to facilitate user selection of which objectives are assigned to a given character in the virtual space. The objective field 202 may be provided by, or in conjunction with, an objective management module that is the same as or similar to objectives management module 114, in accordance with one or more implementations.

The environment field 204 may be configured to receive user selections associated with modifications to the environment of the virtual space. In some implementations, user selection interface 200 (e.g., via environment field 204) may be configured to facilitate user selection of which environmental modifications are perceived by a given character in the virtual space. The environment field 204 may be provided by, or in conjunction with, an environment management module that is the same as or similar to environment management module 116, in accordance with one or more implementations.

The theme field 206 may be configured to receive user selections associated with the theme of the virtual space. In some implementations, user selection interface 200 (e.g., via theme field 206) may be configured to facilitate user selection of which modifications are made to the theme of the virtual space, and/or which thematic modifications are perceived by a given character in the virtual space. The theme field 206 may be provided by, or in conjunction with, a theme management module that is the same as or similar to theme management module 118, in accordance with one or more implementations.

In some implementations, two or more components of system 100 (e.g., virtual space platform(s) 102, server(s) 104, client computing platform(s) 106, token reader 124, and/or external resources 126) may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which two or more components of system 100 may be operatively linked via some other communication media.

A given server 104 may include one or more processors configured to execute computer program modules. The computer program modules may be configured to enable an expert or user associated with the given server 104 to interface with system 100 and/or external resources 126, and/or provide other functionality attributed herein to server(s) 104.

A given client computing platform 106 may include one or more processors configured to execute computer program modules. The computer program modules may be configured to enable an expert or user associated with the given client computing platform 106 to interface with system 100 and/or external resources 126, and/or provide other functionality attributed herein to client computing platform(s) 106. By way of non-limiting example, the given client computing platform 106 may include one or more of a desktop computer, a laptop computer, a handheld computer, a NetBook, a Smartphone, a gaming console, and/or other computing platforms.

The external resources 126 may include sources of information, hosts and/or providers of virtual environments outside of system 100, external entities participating with system 100, and/or other resources. In some implementations, some or all of the functionality attributed herein to external resources 126 may be provided by resources included in system 100.

The virtual space platform(s) 102 may include electronic storage 128, one or more processors 130, and/or other components. The virtual space platform(s) 102 may include communication lines, or ports to enable the exchange of information with a network and/or other computing platforms. Illustration of virtual space platform(s) 102 in FIG. 1 is not intended to be limiting. The virtual space platform(s) 102 may include a plurality of hardware, software, and/or firmware components operating together to provide the functionality attributed herein to virtual space platform(s) 102. For example, virtual space platform(s) 102 may be implemented by a cloud of computing platforms operating together as virtual space platform(s) 102.

Electronic storage 128 may comprise electronic storage media that electronically stores information. The electronic storage media of electronic storage 128 may include one or both of system storage that is provided integrally (i.e., substantially non-removable) with virtual space platform(s) 102 and/or removable storage that is removably connectable to virtual space platform(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 128 may include one or more virtual storage resources (e.g., cloud storage, a virtual private network, and/or other virtual storage resources). Electronic storage 128 may store software algorithms, information determined by processor(s) 130, information received from one or more other components of system 100, and/or other information that enables virtual space platform(s) 102 to function as described herein.

The processor(s) 130 may be configured to provide information processing capabilities in virtual space platform(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. The processor(s) 130 may be configured to execute modules 108, 110, 112, 114, 116, 118, 120, 122, and/or other modules. The processor(s) 130 may be configured to execute modules 108, 110, 112, 114, 116, 118, 120, 122, and/or other modules by software; hardware; firmware; some combination of software, hardware, and/or firmware; and/or other mechanisms for configuring processing capabilities on processor(s) 130.

It should be appreciated that although modules 108, 110, 112, 114, 116, 118, 120, and 122 are illustrated in FIG. 1 as being co-located within a single processing unit, in implementations in which processor(s) 130 includes multiple processing units, one or more of modules 108, 110, 112, 114, 116, 118, 120, and/or 122 may be located remotely from the other modules. The description of the functionality provided by the different modules 108, 110, 112, 114, 116, 118, 120, and/or 122 described herein is for illustrative purposes, and is not intended to be limiting, as any of modules 108, 110, 112, 114, 116, 118, 120, and/or 122 may provide more or less functionality than is described. For example, one or more of modules 108, 110, 112, 114, 116, 118, 120, and/or 122 may be eliminated, and some or all of its functionality may be provided by other ones of modules 108, 110, 112, 114, 116, 118, 120, and/or 122. As another example, processor(s) 130 may be configured to execute one or more additional modules that may perform some or all of the functionality attributed below to one of modules 108, 110, 112, 114, 116, 118, 120, and/or 122.

Figure 3:
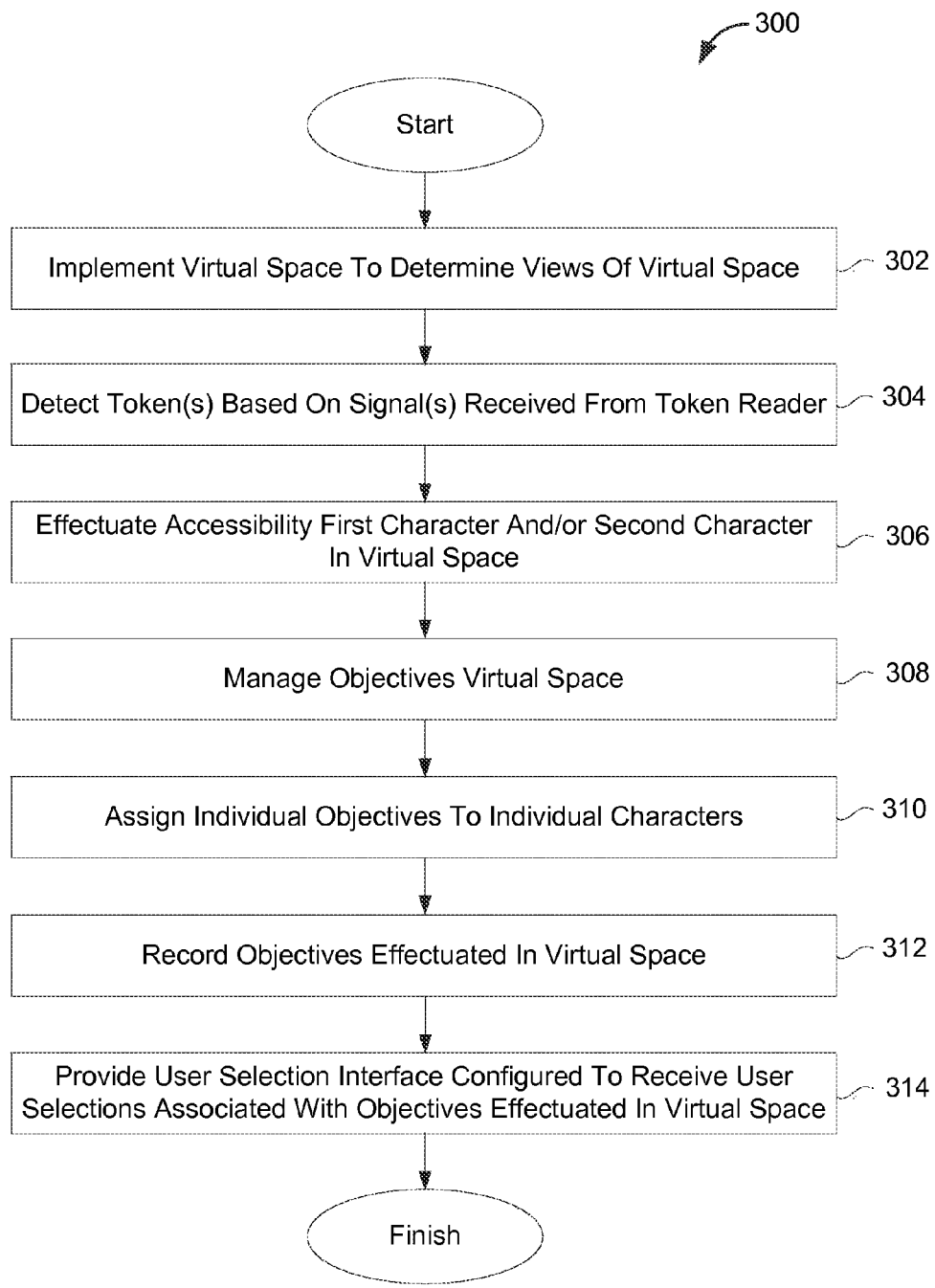
FIG. 3 illustrates a method for managing objectives within a virtual space based on characters made accessible responsive to corresponding tokens being detected, in accordance with one or more implementations.
Figure 4:
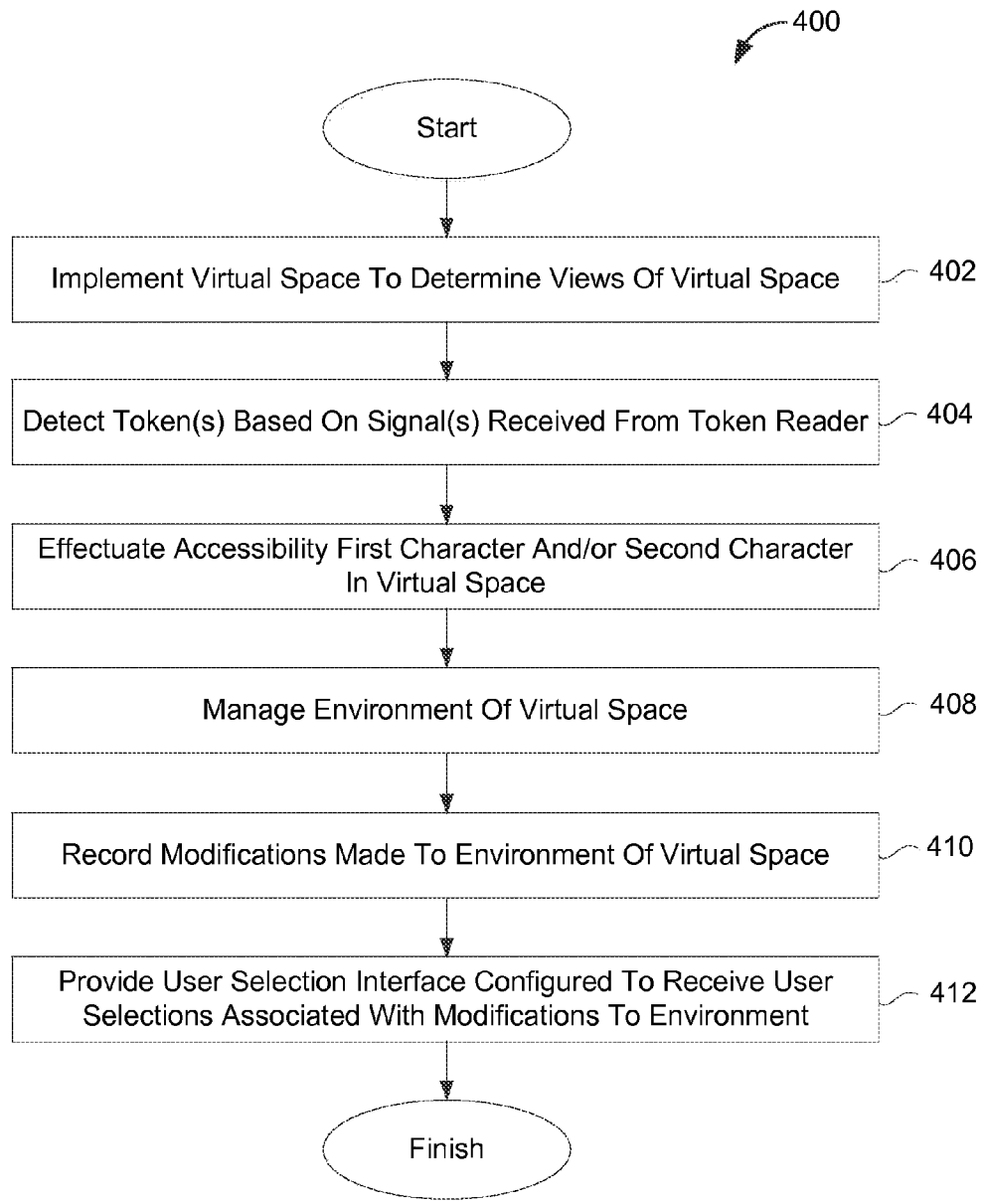
FIG. 4 illustrates a method for managing an environment of a virtual space based on characters made accessible responsive to corresponding tokens being detected, in accordance with one or more implementations.
Figure 5:
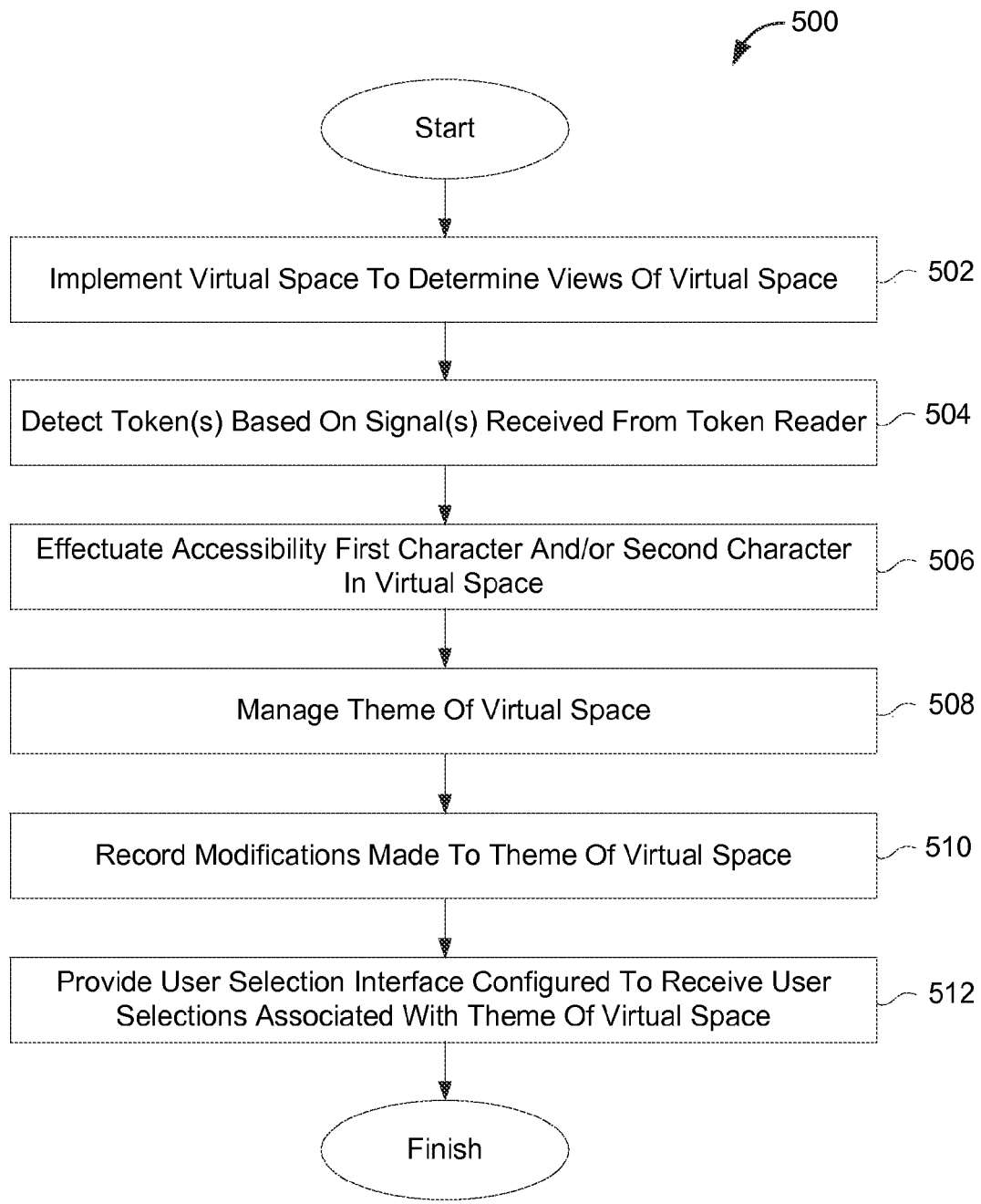
FIG. 5 illustrates a method for managing a theme of a virtual space based on characters made accessible responsive to corresponding tokens being detected, in accordance with one or more implementations.

FIG. 3 illustrates a method 300, FIG. 4 illustrates a method 400, and FIG. 5 illustrates a method 500, in accordance with one or more implementations. The operations of method 300, method 400, and/or method 500 presented below are intended to be illustrative. In some embodiments, method 300, method 400, and/or method 500 may be accomplished with one or more additional operations not described, and/or without one or more of the operations discussed. Additionally, the order in which the operations of method 300, method 400, and/or method 500 are respectively illustrated in FIG. 3, FIG. 4, and/or FIG. 5 and described below is not intended to be limiting.

In some embodiments, method 300, method 400, and/or method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300, method 400, and/or method 500 in response to instructions stored electronically on an electronic storage medium. The one or more processing devices may include one or more devices configured through hardware, firmware, and/or software to be specifically designed for execution of one or more of the operations of method 300, method 400, and/or method 500.

The method 300, illustrated in FIG. 3, is for managing objectives within a virtual space based on characters made accessible responsive to corresponding tokens being detected, in accordance with one or more implementations.

At an operation 302, the virtual space may be implemented to determine views of the virtual space. Operation 302 may be performed by a space module that is the same as or similar to space module 110, in accordance with one or more implementations.

At an operation 304, one or more tokens may be detected based on one or more signals received from one or more token readers. Where the one or more tokens include a first token associated with a first character and a second token associated with a second character, the first token may be detectable based on a first signal conveying information associated with the first token, and the second token may be detectable based on a second signal conveying information associated with the second token. Operation 304 may be performed by a token detection module that is the same as or similar to token detection module 112, in accordance with one or more implementations.

At an operation 306, accessibility may be effectuated of one or both of the first character or the second character in the virtual space. The first character may be accessible responsive to the first token being detected and the second character may be accessible responsive to the second token being detected. Operation 306 may be performed by a space module and/or a token detection module that is/are the same as or similar to space module 110 and/or token detection module 112, respectively, in accordance with one or more implementations.

At an operation 308, objectives associated with the virtual space may be managed. The objectives may include a first objective and a second objective. The first objective may be effectuated in the virtual space responsive to the first token being detected, whereas the second objective may be effectuated in the virtual space responsive to the second token being detected. Operation 308 may be performed by an objectives management module that is the same as or similar to objectives management module 114, in accordance with one or more implementations.

At an operation 310, individual objectives may be assigned to individual characters. In some implementations, the first character may be assigned the first objective responsive to the first objective being effectuated in the virtual space. In some implementations, the first character may be assigned the second objective responsive to the second objective being effectuated in the virtual space. Operation 310 may be performed by an objectives management module that is the same as or similar to objectives management module 114, in accordance with one or more implementations.

At an operation 312, objectives effectuated in the virtual space may be recorded. In some implementations, based on the recorded objectives (1) a given combination of objectives may not be effectuated more than once in the virtual space, (2) a given objective may not be effectuated more than once in the virtual space, or (3) a given objective may not be assigned to the same character more than once. Operation 312 may be performed by a history module that is the same as or similar to history module 120, in accordance with one or more implementations.

At an operation 314, a user selection interface may be provided that is configured to receive user selections associated with the objectives effectuated in the virtual space. Operation 314 may be performed by a user selection interface module that is the same as or similar to user selection interface module 122, in accordance with one or more implementations.

The method 400, illustrated in FIG. 4, is for managing an environment of a virtual space based on characters made accessible responsive to corresponding tokens being detected, in accordance with one or more implementations.

At an operation 402, the virtual space may be implemented to determine views of the virtual space. Operation 402 may be performed by a space module that is the same as or similar to space module 110, in accordance with one or more implementations.

At an operation 404, one or more tokens may be detected based on one or more signals received from one or more token readers. Where the one or more tokens include a first token associated with a first character and a second token associated with a second character, the first token may be detectable based on a first signal conveying information associated with the first token, and the second token may be detectable based on a second signal conveying information associated with the second token. Operation 404 may be performed by a token detection module that is the same as or similar to token detection module 112, in accordance with one or more implementations.

At an operation 406, accessibility may be effectuated of one or both of the first character or the second character in the virtual space. The first character may be accessible responsive to the first token being detected and the second character may be accessible responsive to the second token being detected. Operation 406 may be performed by a space module and/or a token detection module that is/are the same as or similar to space module 110 and/or token detection module 112, respectively, in accordance with one or more implementations.

At an operation 408, an environment of the virtual space may be managed. The environment may be an aggregate of surroundings and conditions of the virtual space. The environment may be modified responsive to one or both of the first token being detected or the second token being detected. Operation 408 may be performed by an environment module that is the same as or similar to environment module 116, in accordance with one or more implementations.

At an operation 410, modifications made to the environment of the virtual space may be recorded. In some implementations, based on the recorded modifications, a given modification to the environment of the virtual space may not be made more than once. Operation 410 may be performed by a history module that is the same as or similar to history module 120, in accordance with one or more implementations.

At an operation 412, a user selection interface may be provided that is configured to receive user selections associated with modifications to the environment of the virtual space. Operation 412 may be performed by a user selection interface module that is the same as or similar to user selection interface module 122, in accordance with one or more implementations.

The method 500, illustrated in FIG. 5, is for managing a theme of a virtual space based on characters made accessible responsive to corresponding tokens being detected, in accordance with one or more implementations.

At an operation 502, the virtual space may be implemented to determine views of the virtual space. Operation 502 may be performed by a space module that is the same as or similar to space module 110, in accordance with one or more implementations.

At an operation 504, one or more tokens may be detected based on one or more signals received from one or more token readers. Where the one or more tokens include a first token associated with a first character and a second token associated with a second character, the first token may be detectable based on a first signal conveying information associated with the first token, and the second token may be detectable based on a second signal conveying information associated with the second token. The first character may be one of a first plurality of characters associated with a first theme, while the second character may be one of a second plurality of characters associated with a second theme. Operation 504 may be performed by a token detection module that is the same as or similar to token detection module 112, in accordance with one or more implementations.

At an operation 506, accessibility may be effectuated of one or both of the first character or the second character in the virtual space. The first character may be accessible responsive to the first token being detected and the second character may be accessible responsive to the second token being detected. Operation 506 may be performed by a space module and/or a token detection module that is/are the same as or similar to space module 110 and/or token detection module 112, respectively, in accordance with one or more implementations.

At an operation 508, a theme of the virtual space may be managed. This may include modifying the theme of the virtual space based on the first theme responsive to the first token being detected, and/or modifying the theme of the virtual space based on the second theme responsive to the second token being detected. Operation 508 may be performed by a theme management module that is the same as or similar to theme management module 118, in accordance with one or more implementations.

At an operation 510, modifications made to the theme of the virtual space may be recorded. In some implementations, based on the recorded modifications, a given modification to the theme of the virtual space may not be made more than once. Operation 510 may be performed by a history module that is the same as or similar to history module 120, in accordance with one or more implementations.

At an operation 512, a user selection interface may be provided that is configured to receive user selections associated with the theme of the virtual space. Operation 512 may be performed by a user selection interface module that is the same as or similar to user selection interface module 122, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to manage objectives within a virtual space based on characters made accessible responsive to corresponding tokens being detected, the system comprising:
    one or more physical processors configured by machine-readable instructions to:
        execute an instance of a virtual space and implement the instance of the virtual space to determine views of the virtual space;
        detect tokens based on signals received from one or more token readers, a given token being a standalone physical object, the tokens including a first token associated with a first character and depicting an appearance of the first character, and a second token associated with a second character and having a physical appearance that is different from the first token, the first token being detectable based on a first signal conveying information associated with the first token, and the second token being detectable based on a second signal conveying information associated with the second token, the first character being accessible in the instance of the virtual space responsive to the first token being detected, and the second character being accessible in the instance of the virtual space responsive to the second token being detected; and
        manage objectives for characters within the virtual space, a given objective for a given character being a purpose or goal that efforts or actions of the given character within the virtual space are intended to attain or accomplish, the objectives including a first objective and a second objective, the first objective being effectuated in the instance of the virtual space that includes the first character responsive to the first token being detected, and the second objective being effectuated in the instance of the virtual space that includes the second character responsive to the second token being detected, wherein virtual space content associated with the objectives is stored at a location other than the one or more tokens;
        wherein the first character is assigned the first objective responsive to the first objective being effectuated in the instance of the virtual space; and
        wherein the first character is assigned the second objective responsive to the second objective being effectuated in the instance of the virtual space.

2. The system of claim 1, wherein the first token is a toy figurine.

3. The system of claim 1, wherein:
    the tokens further include a third token, the third token having a physical appearance that is different from the first token, the third token being detectable based on a third signal conveying information associated with the third token;
    the objectives further include a third objective, the third objective being effectuated in the virtual space responsive to the third token being detected; and
    wherein first character is assigned the third objective responsive to the third objective being effectuated in the instance of the virtual space.

4. The system of claim 1, wherein a third objective is effectuated in the instance of the virtual space responsive to both the first token and the second token being detected, the third objective including one or more attributes of the first objective and one or more attributes of the second objective; and wherein first character is assigned the third objective responsive to the third objective being effectuated in the instance of the virtual space.

5. The system of claim 1, wherein the first objective is modified responsive to the second objective being effectuated in the instance of the virtual space.

6. The system of claim 1, wherein the one or more physical processors are further configured by machine-readable instructions to record objectives effectuated in the instance of the virtual space.

7. The system of claim 6, wherein the one or more physical processors are further configured by machine-readable instructions such that, based on the recorded objectives:
    a given combination of objectives is not effectuated more than once in the instance of the virtual space,
    a given objective is not effectuated more than once in the instance of the virtual space, or
    a given objective is not assigned to the same character more than once.

8. The system of claim 1, wherein the one or more physical processors are further configured by machine-readable instructions to provide a user selection interface, the user selection interface being configured to receive user selections associated with the objectives effectuated in the instance of the virtual space.

9. The system of claim 8, wherein the user selection interface facilitates user selection of which objectives are assigned to a given character in the instance of the virtual space.

10. A computer-implemented method for managing objectives within a virtual space based on characters made accessible responsive to corresponding tokens being detected, the method being performed by a computer system including one or more physical processors and storage media storing machine-readable instructions, the method comprising:

executing an instance of a virtual space and implementing the instance of the virtual space to determine views of the virtual space;

detecting tokens based on signals received from one or more token readers, a given token being a standalone physical object, the tokens including a first token associated with a first character and depicting an appearance of the first character, and a second token associated with a second character and having a physical appearance that is different from the first token, the first token being detectable based on a first signal conveying information associated with the first token, the second token being detectable based on a second signal conveying information associated with the second token;

effectuating accessibility of the first character in the instance of the virtual space, the first character being accessible in the instance of the virtual space responsive to the first token being detected;

effectuating accessibility of the second character in the instance of the virtual space, the second character being accessible in the instance of the virtual space responsive to the second token being detected; and managing objectives for characters within the virtual space, a given objective being a purpose or goal that efforts or actions for a given character within the virtual space are intended to attain or accomplish, the objectives including a first objective and a second objective, the first objective being effectuated in the instance of the virtual space that includes the first character responsive to the first token being detected, and the second objective being effectuated in the instance of the virtual space that includes the second character responsive to the second token being detected, wherein virtual space content associated with the objectives is stored at a location other than the one or more tokens;

wherein the first character is assigned the first objective responsive to the first objective being effectuated in the instance of the virtual space; and wherein the first character is assigned the second objective responsive to the second objective being effectuated in the instance of the virtual space.

11. The method of claim 10, wherein the first token is a toy figurine.

12. The method of claim 10, wherein:
the tokens further comprise a third token, the third token having a physical appearance that is different from the first token, the third token being detectable based on a third signal conveying information associated with the third token;
the objectives further include a third objective, the third objective being effectuated in the virtual space responsive to the third token being detected; and
wherein the method further comprises assigning the first character the third objective responsive to the third objective being effectuated in the instance of the virtual space.

13. The method of claim 10, further comprising effectuating a third objective in the instance of the virtual space responsive to both the first token and the second token being detected, the third objective including one or more attributes of the first objective and one or more attributes of the second objective; and
wherein first character is assigned the third objective responsive to the third objective being effectuated in the instance of the virtual space.

14. The method of claim 10, further comprising modifying the first objective responsive to the second objective being effectuated in the instance of the virtual space.

15. The method of claim 10, further comprising recording objectives effectuated in the instance of the virtual space.

16. The method of claim 15, wherein, based on the recorded objectives:
a given combination of objectives is not effectuated more than once in the instance of the virtual space,
a given objective is not effectuated more than once in the instance of the virtual space, or
a given objective is not assigned to the same character more than once.

17. The method of claim 10, further comprising providing a user selection interface, the user selection interface being configured to receive user selections associated with the objectives effectuated in the instance of the virtual space.

18. The method of claim 17, wherein the user selection interface facilitates user selection of which objectives are assigned to a given character in the instance of the virtual space.

* * * * *